(12) United States Patent
Ohrbom

(10) Patent No.: US 6,639,016 B2
(45) Date of Patent: Oct. 28, 2003

(54) METHOD OF MAKING A GRAFT POLYMER

(75) Inventor: Walter H. Ohrbom, Hartland Township, MI (US)

(73) Assignee: BASF Corporation, Southfield, MI (US)

( * ) Notice: Subject to any disclaimer, the term of this patent is extended or adjusted under 35 U.S.C. 154(b) by 2 days.

(21) Appl. No.: 10/015,096

(22) Filed: Dec. 11, 2001

(65) Prior Publication Data

US 2002/0086950 A1 Jul. 4, 2002

Related U.S. Application Data

(63) Continuation of application No. 09/752,966, filed on Dec. 31, 2000.

(51) Int. Cl.$^7$ .......................... C08C 39/00; C08L 33/08
(52) U.S. Cl. ..................... 525/123; 525/124; 525/303; 525/329.9; 525/330.5; 525/455; 528/45; 528/69; 528/799; 524/507; 524/530; 524/555; 524/589
(58) Field of Search ................................ 525/124, 455, 525/123, 303, 329.9, 330.5; 524/507, 839, 530, 555, 589; 528/45, 69, 199

(56) References Cited

U.S. PATENT DOCUMENTS

| | | | |
|---|---|---|---|
| 4,532,266 A | 7/1985 | Rasshofer et al. | 521/159 |
| 4,644,030 A | 2/1987 | Loewrigkeit et al. | 524/457 |
| 5,173,526 A | * 12/1992 | Vijayendran et al. | 524/457 |
| 5,334,420 A | 8/1994 | Hartung et al. | 427/407.1 |
| 5,356,669 A | 10/1994 | Rehfuss et al. | 427/407.1 |
| 5,726,244 A | * 3/1998 | McGee et al. | 525/78 |
| 5,919,972 A | 7/1999 | Heyman et al. | 560/166 |
| 6,037,441 A | 3/2000 | Ohrbom et al. | 528/367 |
| 6,040,062 A | 3/2000 | McGee et al. | 428/500 |
| 6,063,861 A | 5/2000 | Irle et al. | 524/591 |
| 6,162,506 A | 12/2000 | Lettmann et al. | 427/407.1 |
| 6,166,127 A | * 12/2000 | Tomko | 524/507 |

FOREIGN PATENT DOCUMENTS

| | | | |
|---|---|---|---|
| EP | 0 608 021 | 1/1994 | C09D/151/08 |
| EP | 0 767 187 | 9/1996 | C08G/18/38 |
| EP | 0 841 357 | 11/1997 | C08G/18/08 |
| EP | WO 00/31195 | 6/2000 | C09D/133/06 |
| GB | 899 567 | 5/1961 | |
| WO | WO 00/26315 | 4/2000 | C09D/201/06 |
| WO | WO 00/71505 | 11/2000 | C07C/271/12 |
| WO | WO01/34672 | 5/2001 | C08G/18/08 |
| WO | WO 01/34674 | 5/2001 | C08G/18/67 |

OTHER PUBLICATIONS

English Language for EP 0 841 357, May, 1998.
English Abstract for WO01/34674 Is On The Front Page Of The International Publication, May, 2001.
English Language Search Report PCT/US01/48631 filed Dec. 17, 2001.
English Abstract for WO01/35672 Is On The Front Page Of The International Publication, May, 2001.

* cited by examiner

*Primary Examiner*—James J. Seidieck
*Assistant Examiner*—Olga Asinovsky

(57) ABSTRACT

The invention provides an improved method of graft polymers comprising providing an emulsion comprising at least one or more first monomer (a), at least one or more second monomer (b), and at least one graft material (c). The emulsion is subjected to conditions such that it undergoes simultaneous free radical polymerization and grafting. One or more first monomer (a) is unsaturated and is free of any functional groups reactable with a functional group Fb of monomer (b) or a functional group Fc of graft material (c). Monomer (a) may optionally comprise a functional group Fa which is not reactive with either functional group Fb or Fc. Monomer (b) is unsaturated and comprises a functional group Fb reactive with functional group Fc. Graft material (c) comprises a compound free of unsaturation and comprising a functional group Fc reactive with functional group Fb, and a graft moiety.

10 Claims, No Drawings

METHOD OF MAKING A GRAFT POLYMER

CROSS-REFERENCE TO RELATED APPLICATION

The present application is a continuation of patent application U.S. Ser. No. 09/752,966, filed on Dec. 31, 2000, which is incorporated herein by reference

FIELD OF THE INVENTION

The invention relates to methods of making graft copolymers for use in coating compositions, and more particularly to improved methods of making acrylic graft copolymers having graft moieties such as polyurethane, carbamate, and groups convertible to carbamate.

BACKGROUND OF THE INVENTION

Waterborne acrylic graft copolymers provide a variety of advantages in a number of applications. However, prior art methods of making acrylic graft copolymers for use in water based systems encounter a number of problems.

For example, many prior art acrylic graft copolymers were prepared by first preparing an unsaturated monomer having a graft moiety appended thereto. This monomer was then emulsified, often by high shear or high stress means. The emulsion was then subjected to free radical polymerization.

In many instances, however, the preparation of the unsaturated monomer having the graft moiety appended thereto was particularly challenging. The temperature required for reaction between a functional group of the unsaturated monomer and a functional group of the graft moiety often resulted in gellation of the unsaturated monomer. Another frequently encountered drawback was poor conversion and low yields. As a result, such processes have been disfavored in commercial manufacturing operations.

Thus, it would be advantageous to provide a method of manufacturing a variety of acrylic graft copolymers which does not encounter the gellation and low conversion problems of the prior art. It would be an advantage if such a method could be used with a variety of graft moieties useful in acrylic graft copolymers.

Accordingly, it is an object of the invention to provide a method of making waterborne acrylic graft copolymers which is essentially a one step method and which does not have the disadvantages of the prior art processes.

More particularly, it is an object of the invention to provide a method of making waterborne acrylic graft copolymer which contain polyurethane or carbamate group containing graft moieties.

SUMMARY OF THE INVENTION

These and other objects have been met with the method of the invention. In particular, the invention provides a method of making graft polymers comprising providing an emulsion comprising at least one or more first monomer (a), at least one or more second monomer (b), and at least one graft material (c). The emulsion is subjected to conditions such that it undergoes simultaneous free radical polymerization and grafting. One or more first monomer (a) is unsaturated and is free of any functional groups reactable with functional groups Fb or Fc. Monomer (a) may optionally comprise a functional group Fa which is not reactive with either functional group Fb or Fc. One or more second monomer (b) is unsaturated and comprises a functional group Fb reactive with functional group Fc. Graft material (c) comprises a compound free of unsaturation and comprising a functional group Fc reactive with functional group Fb, and a graft moiety. The saturated graft material (c) may be monomeric, oligomeric, or polymeric. Most preferred graft moieties are carbamate groups, groups convertible to carbamate and polyurethane polymers.

DETAILED DESCRIPTION OF THE PREFERRED EMBODIMENT

The method of the invention requires the use of an emulsion comprising at least one or more first monomer (a), at least one or more second monomer (b), and at least one graft material (c).

One or more first monomer (a) is optional in the broadest sense of the invention but will most preferably be used. Monomer (a) must be unsaturated and may be nonfunctional or may comprise a functional group Fa. If present, functional group Fa must not be reactive with the functional groups Fb or Fc of either monomer (b) or graft material (c). It will be appreciated that the selection of monomer (a) with functional group Fa is therefore dependent upon the selection of functional groups Fb and Fc.

Examples of suitable functional groups Fa include acid groups, hydroxyl groups, epoxy groups, amide groups, carbamate groups, groups convertible to carbamate groups, and mixtures thereof.

Examples of illustrative monomers (a) include, without limitation, alpha, beta-ethylenically unsaturated monocarboxylic acids containing 3 to 5 carbon atoms such as acrylic, methacrylic, and crotonic acids, and the esters, nitriles, and amides of those acids; alpha, beta-ethylenically unsaturated dicarboxylic acids containing 4 to 6 carbon atoms and the anhydrides, monoesters, and diesters of those acids; vinyl esters, vinyl ethers, vinyl ketones, and aromatic or heterocylic aliphatic vinyl compounds.

Representative examples of suitable esters of acrylic methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cycolhexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol.

Representative examples of polymerizable vinyl monomers include, without limitation, such compounds as vinyl acetate, vinyl propionate, vinyl ethers such as vinyl ethyl ether, vinyl and vinylidene halides, and vinyl ethyl ketone.

Representative examples of aromatic or heterocyclic aliphatic vinyl compounds include, without limitation, such compounds as styrene, alpha-methyl styrene, vinyl toluene, tert-butyl styrene, and 2-vinyl pyrrolidone.

Representative examples include acrylic and methacrylic acid amides and aminoalkyl amides; acrylonitrile, and methacrylonitriles.

Other suitable examples include acrylates or methacrylates having hydroxy, epoxy, or other functional groups, such as hydroxyalkyl acrylates and methacrylates, glycidyl esters of methacrylic and acrylic acid such as glycidyl methacrylate, and aminoalkyl esters of methacrylic or acrylic acid like N,N-dimethylaminoethyl (meth)acrylate.

Unsaturated monomers having a carbamate functionality in the ester portion of the monomer may also be used as monomer (a). Such monomers are well known in the art and are described, for example, in U.S. Pat. Nos. 3,479,328, 3,674,838, 4,126,747, 4,279,833, and 4,340,497, the disclosures of which are hereby incorporated by reference. For example, one method of synthesis involves reaction of a hydroxy ester with urea to form the carbamyloxy carboxylate (i.e., carbamate modified acrylate). Another method of synthesis reacts an alpha,beta-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxy group on the hydroxyalkyl carbamate is then esterified by reaction with acrylic or methacrylic acid to form the carbamate functional monomer. Other methods of preparing carbamate modified acrylic monomers are described in the art and can be utilized as well.

Monomer (b) must be at least one or more unsaturated monomers having at least one functional group Fb. Functional group Fb must be reactive with a functional group Fc on graft material (c).

The acrylic graft copolymers of the invention are made by the "simultaneous" free radical polymerization of the unsaturated monomers (a) and (b) and the grafting of graft material (c) via the reaction of functional groups Fb and Fc. "Simultaneous" as used herein refers to essentially concurrent reactions between the unsaturated groups of monomers (a) and (b) and the functional groups Fb and Fc. Put another way, although a variety of competing reactions may be ongoing at any given time and in any given sequence, the graft coplymers of the invention are obtained by subjecting an emulsion containing the monomer (a), the monomer (b) and the graft material (c) to conditions such that both free radical polymerization between monomers (a) and (b) will occur during the same period of time and under the same conditions that reaction between functional groups Fb and Fc will occur.

The functional groups Fb and Fc, respectively of monomer (b) and graft material (c), may thus be selected from a variety of suitable pairs of functional groups. For example, if functional group Fb is an isocyanate group, then functional group Fc of graft material (c) may be any functional group having an active hydrogen group. Illustrative examples of suitable active hydrogen containing groups include hydroxyl groups, amino groups, thiol groups, and the like. Alternatively, functional group Fb could be an acid or anhydride group while functional group Fc could be epoxy or hydroxyl. In another embodiment, functional group Fb could be a carboxy group, a primary or secondary amino group or a phenolic group. It is also possible for either functional group to be carbamate and the other member of the "pair" to be methylol, methoxy, isobutyoxy, and the like.

Preferred "pairs" of functional groups Fb and Fc are isocyanate/hydroxyl, epoxy/acid, and carbonate/amine. Most preferably, the "pair" of functional groups Fb and Fc will be isocyanate/hydroxyl. In one most preferred embodiment of the invention, functional group Fb will be isocyanate and functional group Fc hydroxyl. In another most preferred embodiment of the invention, functional group Fb will be hydroxyl and functional group Fc isocyanate.

Thus, monomer (b) may be selected from the description above with respect to functional monomers (a). Illustrative examples, include, without limitation, unsaturated monomers having functional groups selected from the group consisting of acid groups, amine groups, epoxy groups, anhydride groups, hydroxyl groups, isocyanate groups and mixtures thereof.

Isocyanate functional unsaturated monomers are known in the art. Illustrative examples, include meta-isopropenyl-alpha,alpha-dimethylbenzyl isocyanate and isocyanatoethyl methacrylate. Meta-isopropenyl-alpha,alpha-dimethylbenzyl isocyanate is most preferred for use as monomer (b) in a particularly preferred embodiment of the invention.

In another most preferred embodiment of the invention, the monomer (b) will be a hydroxyl functional monomer such as hydroxyalkyl acrylates and methacrylates. Particularly preferred hydroxy functional monomers (b) are hydroxyethyl (meth)acrylate, hydroxypropyl (meth)acrylate, and isomers of hydroxy butyl (meth)acrylate. A most preferred monomer (b) in a particularly preferred embodiment of the invention is hydroxyethyl methacrylate.

The graft material (c) may be monomeric, oligomeric, or polymeric in nature. However, it must be free of any unsaturation and must contain reactive functional group Fc and a graft moiety. Finally, graft material (c) must be emulsifiable, that is graft material (c) must be liquids or above their $T_g$ at room temperature.

It will be appreciated that all of monomers (a) and (b) and graft material (c) must be dispersible into a micelle formation. Such emulsification may occur with chemical aids, i.e., ionic and/or nonionic surfactants; or mechnical means via the use of high stress or high shear equipment such as microfluidizers.

Conventional surfactants include, without limitation, anionic, nonionic emulsifiers or mixtures thereof. Typical anionic emulsifiers include the salts of fatty rosin and naphthenic acids, low molecular weight condensation products of naphthalene sulfonic acid and formaldehyde, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyvinyl alcohols, polyoxyethylenated alkyl alcohols, amine polyglycol condensates, modified polyethoxy adducts, long chain carboxylic acid esters, modified terminated alkylaryl ethers, and alkylpolyether alcohols. Typical ranges for such emulsifiers and surfactants are between 0.1 and 6 percent by weight, based on the total weight of monomers (a), (b), and graft material (c).

In addition, graft material (c) will also have a graft moiety which may be aliphatic, cycloaliphatic, and/or aromatic. The graft moiety may and most preferably will contain heteroatoms. Illustrative and preferred graft moieties are polyurethane oligomers and polymers, and monomers, oligomers and polymers containing carbamate groups, groups convertible to carbamate and mixtures thereof. Examples of groups convertible to carbamate include epoxy and carbonate groups, i.e., the epoxy groups may be converted to carbonate via reaction with carbon dioxide followed by conversion to the carbamate group with ammonia. Polyurethane polymers and carbamate groups, especially primary carbamate groups, are most preferred for use as the graft moiety of graft material (c).

Graft material (c) will thus have a functional group Fc which is the corresponding functional group pair to functional group Fb of monomer (b) such as is described above.

Most preferred for use as functional group Fc of graft material (c) are hydroxyl groups and isocyanate groups.

Particularly preferred graft materials (c) are isocyanate functional polyurethanes and hydroxy functional alkyl carbamate such as hydroxypropyl carbamate, hydroxybutyl carbamate, and hydroxypropyl carbamate which has been extended with e-caprolactam. Hydroxypropyl carbamate is most preferred.

In a particularly preferred embodiment, the monomers (a) and (b) will be prepared in a preemulsion using surfactants as described above. Graft material (c) will be then be added to the preemulsion of monomers (a) and (b) using either chemical or mechanical means to form the desired emulsion of monomers (a), (b) and graft material (c).

The emulsion will contain free radical initiators. Illustrative examples include, without limitation, peroxide, persulfates, redox couples, azo compounds, and nonchemical means including ultrasound, UV light, ionizing radition, and the like. Specific examples of useful intiators include hydrogen peroxide, and ammonium persulfate.

Chain transfer agents may also be used in the emulsion of the invention. Illustrative examples include isopropanol, thiols such as octanethiol or mercaptoethanol, organohalides such as chloroform, diacetone alcohol, and the dimer of alpha-methyl styrene.

The emulsion will typically be subjected to temperatures of from 20 degrees C. to about 200 degrees C., prefeably from about 90 to 170 degrees C.

The coating compositions of the invention contain aqueous dispersions of the grafted acrylic polymer.

The composition of the invention is cured by a reaction of the acrylic graft copolymer of the invention with a crosslinking agent having a plurality of functional groups that are reactive with the graft moiety or with the functional groups Fa on the acrylic copolymer resulting from monomer (a).

Suitable functional groups for use on the crosslinking agent include active methylol or alkoxy groups on aminoplast resins or on other compounds, such as phenol/formaldehyde adducts; blocked isocyanate groups; or siloxane groups. Examples of suitable crosslinking agents are melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), N-methylol acrylamide emulsions, isobutoxy methyl acrylamide emulsions, and polysiloxanes (e.g., trimethoxy siloxane). Aminoplast resins such as melamine formaldehyde resins or urea formaldehyde resins are especially preferred.

The crosslinking agent is used in an amount sufficient to produce well-cured, solvent-resistant films. For example, when the preferred melamine curing agents are used, they are used at a total of 3 to 30 weight percent, based upon the total weight of the acrylic graft copolymer of the invention and the crosslinking agent.

The coating composition used in the practice of the invention may also include a catalyst to enhance the cure reaction. For example, when aminoplast compounds, especially monomeric melamines, are used as a crosslinking agent, a strong acid catalyst may be utilized to reduce the temperature or time needed for full cure. Such catalysts are well-known in the art and include, for example, p-toluenesulfonic acid, dinonylnaphthalene disulfonicacid, dodecylbenzenesulfonic acid, phenyl acid phosphate, monobutyl maleate, butyl phosphate, and hydroxy phosphate ester. These catalysts may be blocked, for example, with an amine, or they may be unblocked. Other catalysts that may be useful in the composition of the invention include Lewis acids, zinc salts, and tin salts such as dibutyl tin dilaurate or dibutyl tin oxide.

Additional water and or cosolvent may be added during preparation of the coating compositions. In a preferred embodiment of the invention, the water and organic solvent, including any cosolvent, is present in the coating composition in an amount of from about 0.01 weight percent to about 99 weight percent, preferably from about 40 weight percent to about 90 weight percent, and more preferably from about 50 weight percent to about 70 weight percent.

Other materials well-known to the coatings artisan, for example, surfactants, fillers, stabilizers, wetting agents, dispersing agents, adhesion promoters, UV absorbers, light stabilizers such as HALS, antioxidants, and rheology control agents, may be incorporated into the coating composition. The amount of these materials used must be controlled to avoid adversely affecting the coating characteristics.

The coating compositions according to the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When the present coating compositions are used as topcoat coatings, they preferably have a 20.degree. gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating. The coating composition of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like. In a preferred embodiment, the coating composition of the present invention is the clearcoat of a color-plus-clear composite coating. The clearcoat may be applied over a color coat according to the invention or may, alternatively, be applied over a color coat of a formulation already known in the art.

Pigmented color coat or basecoat compositions for such composite coatings are well-known in the art and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinking or may require a separate crosslinking agent that is reactive with the functional groups of the polymer. When the polymer comprises hydroxy functional groups, for example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

Coating compositions can be coated on the article by any of a number of techniques well-known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

The coating compositions described herein are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93.degree. C. and 177.degree. C. In a preferred embodiment, the cure temperature is between 135.degree. C. and 165.degree. C. In another preferred embodiment, a blocked acid catalyst is included in the composition and the cure temperature is between 115.degree. C. and 140.degree. C. In a different preferred embodiment, an unblocked acid catalyst is included in the composition and the cure temperature is between 80.degree. C. and 100.degree. C. The curing time will vary depending on the particular components used and physical parameters, such as the thickness of the layers. Typical curing times range from 15 to 60 minutes, and preferably 15–25 minutes at the target temperature.

What is claimed is:

1. A method of making a graft copolymer, comprising providing an emulsion comprisng
   (a) optionally, at least one or more first monomer,
   (b) at least one or more second monomer, and
   (c) at least one graft material, and
   subjecting the emulsion to simultaneous free radical polymerization and grafting,
   wherein
      one or more first monomer (a) is unsaturated and is free of any functional groups reactable with a functional group Fb of monomer (b) or a functional group Fc of graft material (c),
      one or more second monomer (b) is unsaturated and comprises a functional group Fb reactive with functional group Fc of graft material (c), and,
      graft material (c) comprises a compound free of unsaturation and comprising a functional group Fc reactive with functional group Fb of monomer (b), and a graft moiety.

2. The method of claim 1 wherein one or more first monomer (a) comprises a functional group selected from the group consisting of acid groups, hydroxyl groups, epoxy groups, amide groups, carbamate groups, groups convertible to carbamate groups, and mixtures thereof.

3. The method of claim 2 wherein one or more first monomer (a) is selected from the group consisting of acrylic acid, methacrylic acid, carbamate functional unsaturated monomers, and mixtures thereof.

4. The method of claim 2 wherein one or more first monomer (a) comprises a nonfunctional monomer selected from the group consisting of styrene, alpha methyl styrene, alkyl esters of acrylic or methacrylic acid, and mixtures thereof.

5. The method of claim 1 wherein functional group Fb of monomer (b) is selected from the group consisting of isocyanate and hydroxyl.

6. The method of claim 5 wherein monomer (b) is a hydroxyalkyl (meth)acrylate.

7. The method of claim 5 wherein monomer (b) is meta-isopropenyl alpha,alpha-dimethylbenzyl isocyanate.

8. The method of claim 1 wherein graft material (c) is an isocyanate functional polyurethane polymer or oligomer.

9. The method of claim 1 wherein graft material (c) is a hydroxyalkyl carbamate.

10. A coating composition comprising
   a graft copolymer, obtained from a process comprising providing an emulsion comprising
      (a) optionally, at least one or more first monomer,
      (b) at least one or more second monomer, and
      (c) at least one graft material, and
   subjecting the emulsion to simultaneous free radical polymerization and grafting,
   wherein
      one or more first monomer (a) is unsaturated and is free of any functional groups reactable with a functional group Fb of monomer (b) or a functional group Fc of graft material Fc,
      one or more second monomer (b) is unsaturated and comprises a functional group Fb reactive with functional group Fc of graft material (c), and,
      graft material (c) comprises a free of unsaturation and comprising a functional group Fc reactive with functional group Fb of monomer (b), and a graft moiety, and
   a crosslinking agent.

* * * * *